United States Patent
Yamashita et al.

(10) Patent No.: US 7,008,112 B2
(45) Date of Patent: Mar. 7, 2006

(54) HYDRODYNAMIC BEARING DEVICE

(75) Inventors: Nobuyoshi Yamashita, Mie-ken (JP); Tetsuya Kurimura, Mie-ken (JP)

(73) Assignee: NTN Corporation, Osaka-fu (JP)

( * ) Notice: Subject to any disclaimer, the term of this patent is extended or adjusted under 35 U.S.C. 154(b) by 253 days.

(21) Appl. No.: 10/405,081

(22) Filed: Apr. 2, 2003

(65) Prior Publication Data

US 2004/0013329 A1    Jan. 22, 2004

(30) Foreign Application Priority Data

Apr. 5, 2002   (JP)   .............................. 2002-103837
Sep. 18, 2002  (JP)   .............................. 2002-272115

(51) Int. Cl.
*F16C 32/06* (2006.01)
(52) U.S. Cl. ....................... 384/119; 384/107
(58) Field of Classification Search ................ 384/100, 384/107, 112, 114, 119, 121, 123, 130, 132; 310/90; 360/99.08, 98.07; 417/354
See application file for complete search history.

(56) References Cited

U.S. PATENT DOCUMENTS 5,810,481 A * 9/1998 Nii et al. ..................... 384/107
6,242,830 B1 * 6/2001 Katagiri ....................... 384/114
2002/0025089 A1 * 2/2002 Mori et al. ................. 384/100

FOREIGN PATENT DOCUMENTS

JP         2002-061636 A      2/2002

* cited by examiner

*Primary Examiner*—Thomas R. Hannon
(74) *Attorney, Agent, or Firm*—Arent Fox PLLC (57) ABSTRACT

A hydrodynamic bearing device with reduced costs is provided. A housing with a bearing sleeve housed therein is formed by drawing. A cup shaped thrust member is positioned in a bottom part of the housing, and by bringing this thrust member into contact with a lower end surface of the bearing sleeve, the widths of thrust bearing gaps within first and second thrust bearing parts are set to prescribed values.

18 Claims, 11 Drawing Sheets

HYDRODYNAMIC BEARING DEVICE

BACKGROUND OF THE INVENTION

1. Field of the Invention

The present invention relates to a hydrodynamic bearing device. This hydrodynamic bearing device is ideal for use in motors for information technology equipment, including a spindle motor used in a magnetic disk apparatus such as HDD and FDD, an optical disk apparatus such as CD-ROM and DVD-ROM, and a magnetic optical disk apparatus such as MD and MO, and a polygon scanner motor used in a laser printer (LBP), and is also ideal for use in small motors for electrical equipment such as an axial fan.

2. Description of the Related Art

In each of the different types of motor described above, in addition to high rotational accuracy, increased speed, reduced costs, and reduced noise are all keenly sought after performance factors. One of the structural elements which determines these factors is the bearing which supports the motor spindle, and in recent years, the use of hydrodynamic bearing devices which display superior characteristics for the performance factors described above has been the subject of much investigation, and in some cases, these bearings have been used in practical applications.

Figure 11:
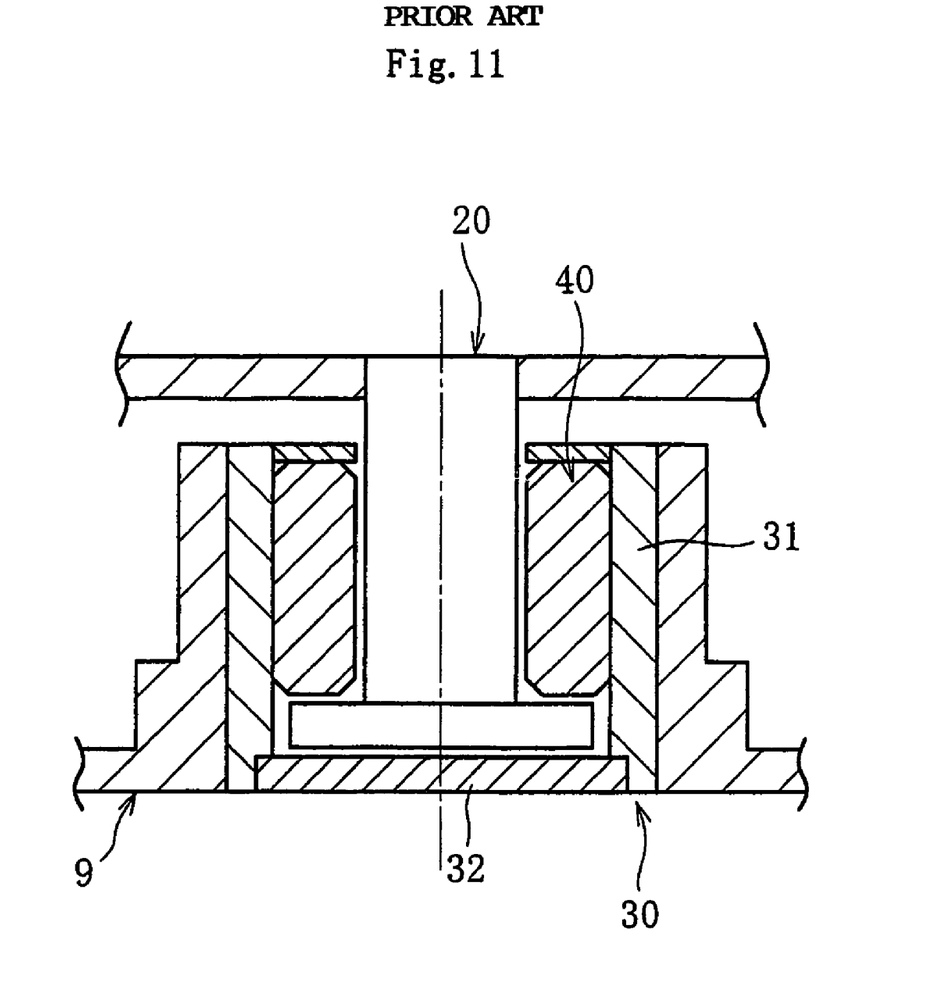
FIG. 11 is a cross-sectional view showing a hydrodynamic bearing device incorporated into a spindle motor.

For example, a construction has been disclosed for a hydrodynamic bearing device for integration within a spindle motor for a disk apparatus (refer to Japanese Patent Laid-Open Publication No. 2002-061636), in which, as shown in FIG. 11, a bearing sleeve 40 is secured to the inner periphery of a housing 30, and an axial member 20 is positioned inside the bearing sleeve 40. In this hydrodynamic bearing device, rotation of the axial member 20 causes pressure to be generated by a fluid dynamic pressure effect in a radial bearing gap between the inner periphery of the bearing sleeve 40 and the outer periphery of the axial member 20, and the axial member 20 is supported in a non-contact state.

In this hydrodynamic bearing device, the housing 30 is formed by sealing the bottom opening of a cylindrical peripheral part 31 with a thrust bush 32. The thrust bush 32 is secured to the bottom opening of the peripheral part 31 using an adhesive, although other methods such as caulking, or a combination of caulking and adhesive can also be used.

In conventional devices, because the housing is formed from a turned metal such as copper, the productions costs for the housing continue to rise considerably. Furthermore, because the bearing sleeve is secured to the inner periphery of the housing using an adhesive, steps are required for applying and then drying the adhesive, making the assembly process more complex, and further increasing the production costs. In addition, because the thrust bush 32 is secured to the peripheral part 31 using an adhesive and/or caulking, as described above, this process also invites further increases in cost.

SUMMARY OF THE INVENTION

The present invention aims to solve the problems outlined above, with an object of reducing the costs associated with producing a hydrodynamic bearing device.

In order to achieve the above object, the present invention provides a hydrodynamic bearing device including an axial member 2, a bearing sleeve 4, a housing 3 with the bearing sleeve 4 secured to an inner periphery thereof, a radial bearing gap formed between an outer periphery of the axial member 2 and the inner periphery of the bearing sleeve 4, and sealing means 5 for sealing one end of the housing 3, in which by relative rotation of the axial member 2 and the bearing sleeve 4, pressure is generated in the radial bearing gap by a fluid dynamic pressure effect, thereby supporting the axial member 2 and the bearing sleeve 4 in a non-contact state, wherein the housing 3 is a press molded product (refer to FIG. 1, FIG. 3 through FIG. 10, and FIG. 12 through FIG. 17).

By using a press molded housing, processing of the housing can be completed at a lower cost than for a turned housing. In this description, the term "press molded product" refers not only to items formed by so-called sheet metal pressing, but to all products produced using a press apparatus with a mounted die, and includes the production of pipe materials, for example. The positioning in an axial direction of the bearing sleeve within the housing can be achieved by producing a partial plastic deformation within the housing. For example, positioning in one axial direction can be performed via an engagement part 3c provided in the housing 3, and positioning in the other axial direction can be performed either directly or indirectly via a bottom part 3b, a stepped part 3d, or an engagement part 3h provided in the housing 3 (each of these parts are described below in further detail).

In this hydrodynamic bearing device, a thrust bearing surface 7 which opposes an end surface 4b at an unsealed side of the bearing sleeve 4 across an intervening space may also be provided, and a flange part 2b on the axial member 2 is then positioned within this space. A first thrust bearing gap can then be formed between the unsealed end surface 4b of the bearing sleeve 4 and one end surface 2b1 of the flange part 2b, and a second thrust bearing gap can be formed between the other end surface 2b2 of the flange part and the thrust bearing surface 7 (refer to FIG. 1, FIG. 3 through FIG. 7, FIG. 9, FIG. 10, and FIG. 14).

The thrust bearing surface 7 can be formed, for example, on a thrust member 6 which contacts the unsealed end surface 4b of the bearing sleeve 4 (refer to FIG. 1, FIG. 3, FIG. 9, and FIG. 10). As a result, the widths of the first and the second thrust bearing gaps can be adjusted to prescribed values, and an ideal thrust dynamic pressure can be generated between the two bearing gaps. A possible example of the thrust member 6 which contacts the unsealed end surface 4b is a cup shaped member (thrust cup), with the thrust bearing surface 7 formed on the bottom inside surface of this cup shaped member.

Figure 4:
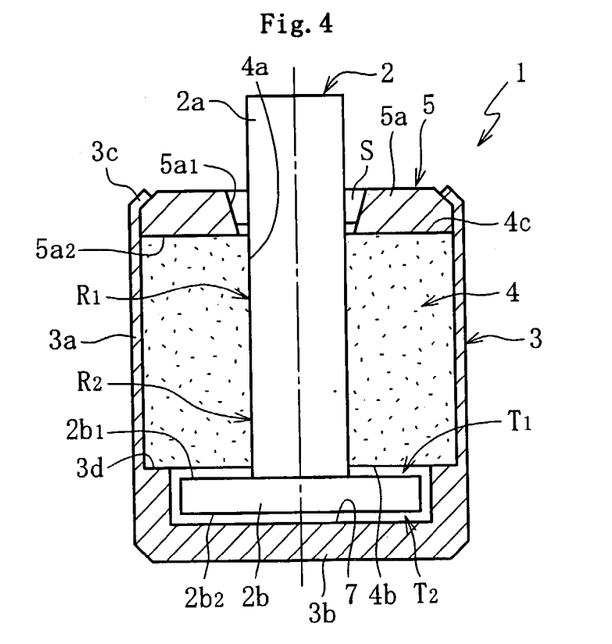
FIG. 4 is a cross-sectional view showing yet another embodiment of the hydrodynamic bearing device.
Figure 5:
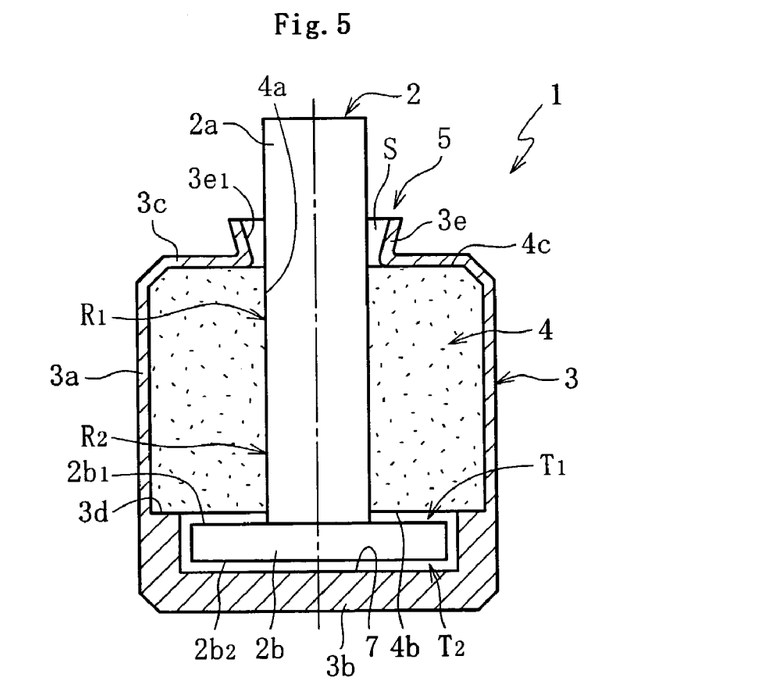
FIG. 5 is a cross-sectional view showing yet another embodiment of the hydrodynamic bearing device.
Figure 6:
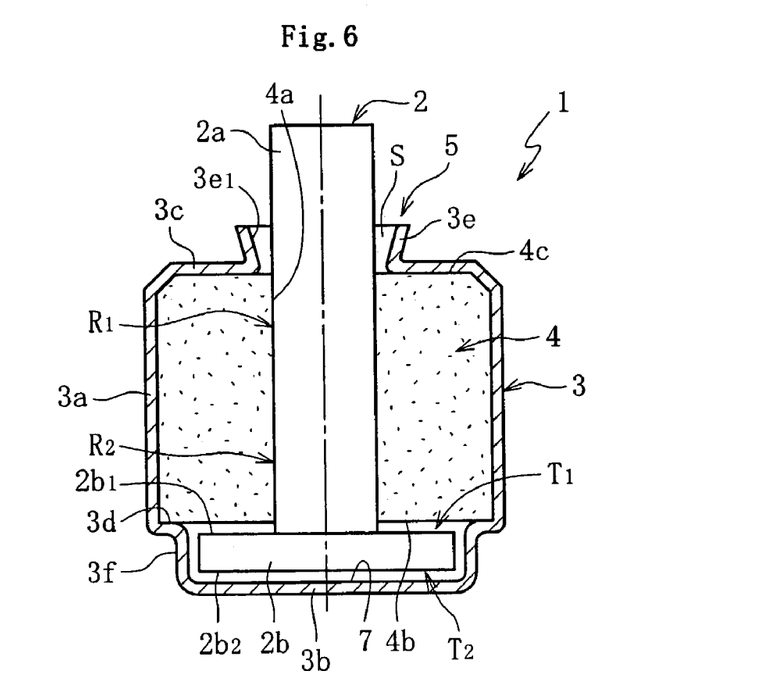
FIG. 6 is a cross-sectional view showing yet another embodiment of the hydrodynamic bearing device.

In addition, the thrust bearing surface 7 can also be formed as an integral part of the housing 3 (refer to FIG. 4 through FIG. 6). By so doing, the thrust member 6 becomes unnecessary, and consequently further cost reductions are possible due to the reduced number of components. In such a case, a stepped part 3d is provided in the housing 3, and by engaging this stepped part 3d with the unsealed end surface 4b of the bearing sleeve 4, the width of the thrust bearing gap can be adjusted to a prescribed value, and the bearing sleeve can be restricted and positioned from the unsealed side.

Figure 7:
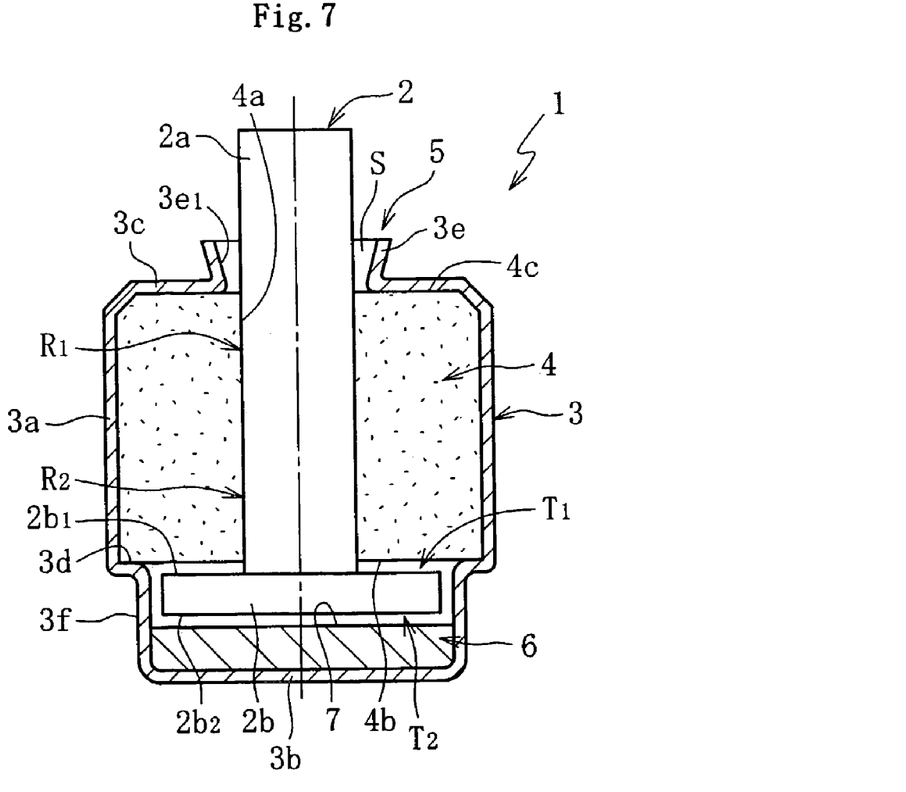
FIG. 7 is a cross-sectional view showing yet another embodiment of the hydrodynamic bearing device.

The thrust bearing surface 7 can also be formed on a thrust member 6 made of an oil impregnated sintered metal (refer to FIG. 7). In such a case, because oil is exuded from the thrust bearing surface 7, friction between the flange part end surface 2b2 of the axial member 2 and the thrust bearing surface 7 during starting and stopping of the motor can be reduced, enabling the wear on both components to be suppressed. Furthermore, because sintered metals offer a good level of workability, even in cases in which dynamic pressure generating grooves are formed in the thrust bearing surface 7, press molding of the thrust member 6 still enables such dynamic pressure generating grooves to be formed easily and with a high level of precision.

The sealing means 5 can be formed from a ring shaped sealing member 5a (refer to FIG. 1, FIG. 3, FIG. 4 and FIG. 9). In such a case, a radially inward facing plastic deformed engagement part 3c is provided at the sealed side of the housing 3, and by engaging this engagement part 3c with the sealing member 5a, movement of the bearing sleeve 4 towards the sealed side can be regulated by the sealing member 5a.

In addition, the sealing device can also be formed by narrowing the diameter of the housing 3 (refer to FIG. 5 through FIG. 8, and FIG. 14), and in such cases the sealing member becomes unnecessary, meaning further cost reductions are possible due to the reduced number of components. An example of a technique for narrowing the diameter of the housing 3 is necking. In this case, a radially inward facing plastic deformed engagement part 3c is provided at the sealed side of the housing 3, and by engaging this engagement part 3c with the bearing sleeve 4, movement of the bearing sleeve 4 towards the sealed side can be regulated directly.

Movement of the bearing sleeve 4 towards the unsealed side of the housing 3 is regulated by contact between the unsealed end surface 4b of the bearing sleeve 4 and the thrust member 6 or the stepped part 3d. Accordingly, the engagement part 3c described above, in combination with the thrust member 6 or the stepped part 3d, enables the bearing sleeve 4 to be positioned in both axial directions, thereby enabling the bearing sleeve 4 to be secured inside the housing 3 without using adhesives or press fitting.

The housing 3 can be formed by drawing of a metal plate. A housing 3 formed in this manner has an integrated bottom part 3b. Furthermore, the housing 3 can also be formed by at least a partial plastic deformation of a metal pipe material (including pipe materials formed by drawing of a metal plate). Examples of the parts subjected to plastic deformation are the engagement parts 3c and 3h (described below) at the sealed and unsealed sides respectively. If a pipe material is used, then the bottom part of the housing 3 will remain open, although this opening can be sealed with the thrust member 6 which contacts the unsealed end surface 4b of the bearing sleeve 4. In such a case, a radially inward facing plastic deformed engagement part 3h is provided at the unsealed side of the housing 3, and positioning of the thrust member 6, and then the bearing sleeve 4, are performed by engaging this engagement part 3h with the thrust member 6.

If the housing 3 is a precut metal, then a high degree of precision (with a tolerance of approximately 10 $\mu$m) can be achieved. However, in the case of a housing 3 formed as the type of press molded product described above, precision is far more difficult to achieve, and the tolerance is limited to approximately 20 to 40 $\mu$m. Consequently, in those cases in which the bearing sleeve 4 is secured by an adhesive to the inner periphery of the housing 3, as in conventional processes, reductions in the coaxiality of these two members become increasingly problematic, and solving this problem requires significant tooling, which results in increased costs.

One possible method of solving the above problem involves press fitting a cylindrical bearing sleeve 4 onto the inner cylindrical surface of the housing 3, thereby securing the bearing sleeve 4, but the stress associated with the press fitting process causes the inner periphery of the bearing sleeve 4 to undergo deformation with a narrowing of the internal diameter, which increases the possibility of a deterioration in the precision of the radial bearing surface and the radial bearing gap.

Accordingly, in the present invention, the inner periphery of the housing and the outer periphery of the bearing sleeve were designed to undergo partial contact. As a result, because the rigidity in a radial direction is reduced the bearing sleeve 4 and the housing 3 can be secured reliably, and at low cost. Furthermore, because the compressive stress acting on the interior of the bearing sleeve is reduced, the amount of deformation of the inner periphery of the bearing sleeve 4 can be suppressed. Following processing of the housing, by performing a subsequent heat treatment (such as an annealing process) to reduce the hardness and the yield point stress of the housing, a large press fitting force can be retained, while the compressive stress is further reduced.

The partial contact described above can be achieved by forming either the outer periphery of the bearing sleeve or the inner periphery of the housing with a polygonal or wave shaped cross-section.

The bearing sleeve 4 is then press fitted into the inner periphery of the housing. Providing the narrowing in the internal radius of the bearing sleeve following press fitting is no more than 2 $\mu$m, the precision of the radial bearing surface and the radial bearing gap can be maintained at a high level.

DETAILED DESCRIPTION OF THE INVENTION

As follows is a description of embodiments of the present invention, based on FIG. 1 through FIG. 18.

Figure 1:
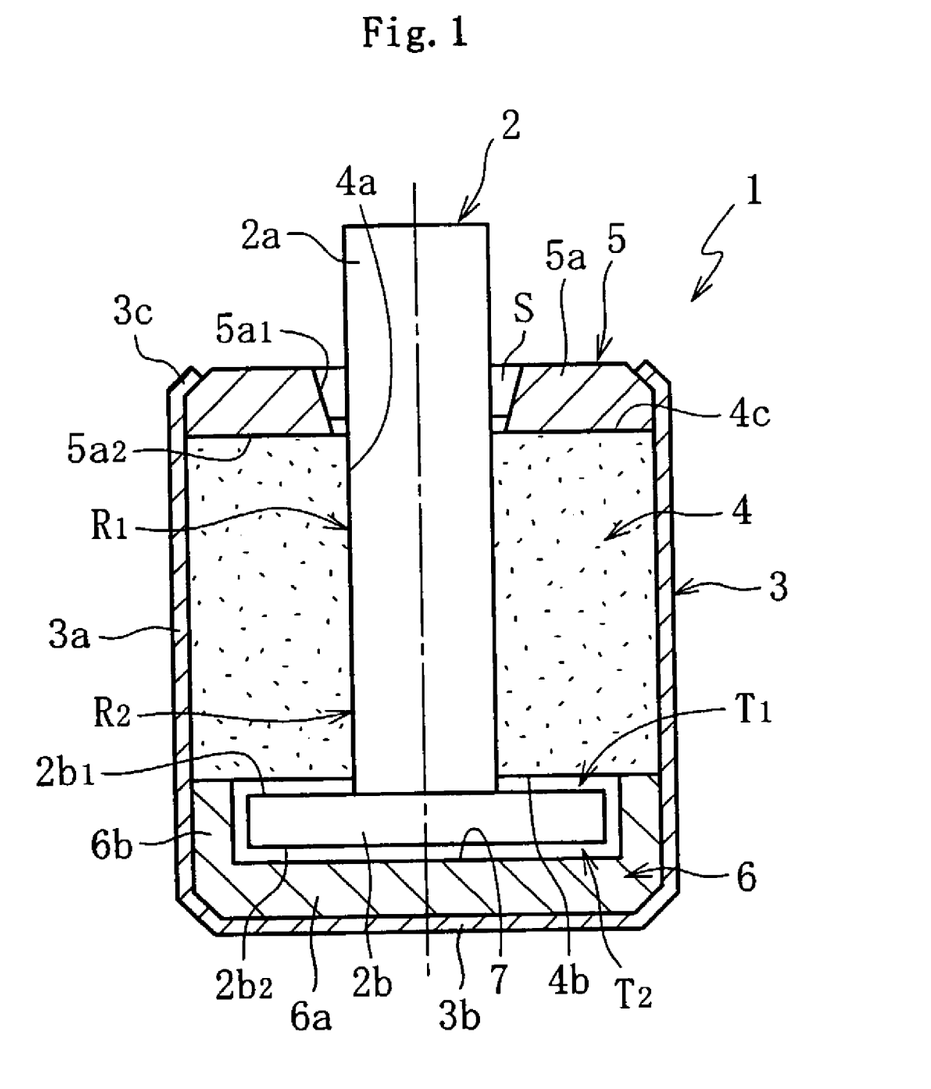
FIG. 1 is a cross-sectional view showing a hydrodynamic bearing device according to the present invention.

FIG. 1 shows a first embodiment of a hydrodynamic bearing device 1 according to the present invention. This hydrodynamic bearing device 1 includes an axial member 2, a housing 3, a cylindrical bearing sleeve 4 secured inside the housing 3, sealing means 5 for sealing one end of the housing 3, and a thrust member 6 provided in the bottom part of the housing 3 as the principal structural elements. The housing 3 is secured inside a spindle motor shown in FIG. 11, inside the inner periphery of a casing 9, to which a motor stator, which is not shown in the figures, is mounted.

In each of the above figures, the side of the housing 3 which is sealed with the sealing means 5 is termed the "sealed side" (the top side in the figures), and the opposite side is termed the "unsealed side" (the lower side in the figures).

The housing 3 is a thin walled press molded product formed in the shape of a cup by drawing of a metal plate (for example, a plate of steel or a soft metal such as brass). The housing 3 shown in the figures is an integrated structure including a cylindrical peripheral part 3a, a circular plate bottom part 3b formed at the unsealed side, and a tapered engagement part 3c formed at the end part on the sealed side. In order to reduce burrs and deformation caused during the press working, the housing can be subjected to after treatment such as barrel polishing after the press working process.

The axial member 2 is made of a metal material such as stainless steel (SUS420J2), and includes an axial part 2a, and a flange part 2b provided at the lower end of the axial part 2a. The axial part 2a and the flange part 2b can be integrated together by press fitting of two separate components, or can also be formed as a single integrated unit using a technique such as forging.

The bearing sleeve 4 is made of an oil impregnated sintered metal produced by impregnating a sintered metal, such as a sintered metal of copper as the principal constituent, with a lubricating oil or a lubricating grease. This oil impregnated sintered metal comprises internal pores (structure pores), and surface pores where these pores open out onto the surface of the metal, and the oil is retained within these pores.

A first radial bearing part R1 and a second radial bearing part R2 are provided between an inner peripheral surface 4a of the bearing sleeve 4 and the outer peripheral surface of the axial part 2a of the axial member 2, with an axial separation between the two parts. A radial bearing surface (the radial bearing surfaces of the first radial bearing part R1 and the second radial bearing part R2), which is separated into an upper region and a lower region along the axial direction, is provided on the inner peripheral surface of the bearing sleeve 4.

Figure 2A:
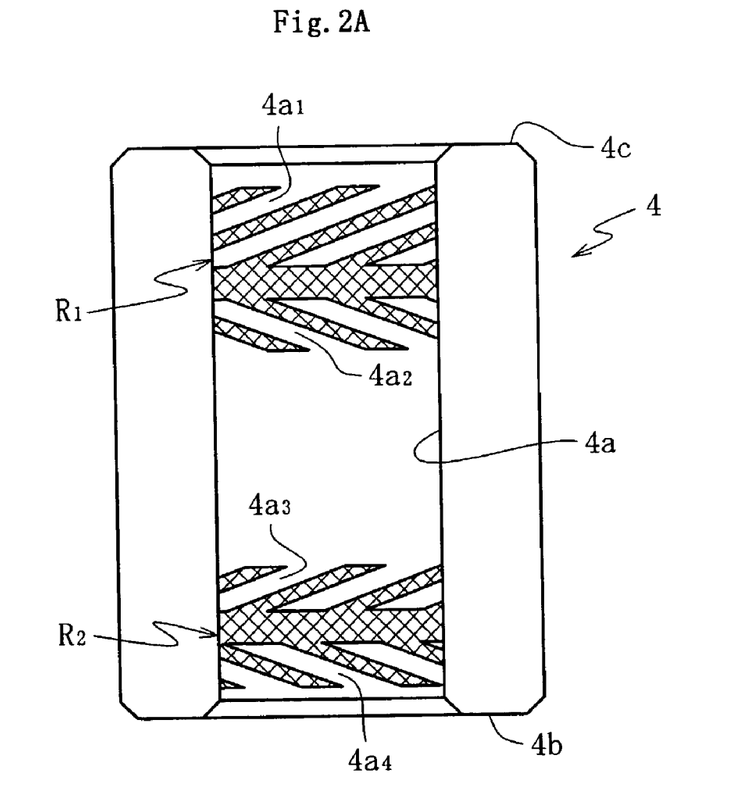
FIG. 2A is a cross-sectional view of a bearing sleeve used in the hydrodynamic bearing device.

As shown in FIG. 2A, the region which represents the radial bearing surface of the first radial bearing part R1 includes a plurality of dynamic pressure generating grooves 4a1, 4a2 formed in a herringbone pattern. In this embodiment, the length in an axial direction of the upper dynamic pressure generating grooves 4a1 is larger than that of the lower dynamic pressure generating grooves 4a2, which are inclined in the opposite direction, resulting in an asymmetric pattern in the axial direction.

The region which represents the radial bearing surface of the second radial bearing part R2 also includes a plurality of dynamic pressure generating grooves 4a3, 4a4 formed in a herringbone pattern. The plurality of dynamic pressure generating grooves 4a3 inclined towards one axial direction, and the plurality of dynamic pressure generating grooves 4a4 inclined towards the opposite axial direction are separated in the axial direction. In contrast to the first radial bearing part R1, the lengths in an axial direction of the dynamic pressure generating grooves 4a3 and 4a4 are equal to each other, resulting in a symmetric pattern in the axial direction. The total length in the axial direction of the first radial bearing part R1 is longer than the total length in the axial direction of the second radial bearing part R2.

There are no particular restrictions on the shape of the dynamic pressure generating grooves in these regions which represent the radial bearing surfaces.

The thrust member 6 in this embodiment is a cup shaped member known as a thrust cup, and is formed by turning brass or steel, or forging steel. The inner surface of a bottom part 6a of the thrust member 6 is a thrust bearing surface 7 which opposes the lower end surface 2b2 of the flange part 2b, and a cylindrical raised part 6b is formed as an integral part at the peripheral edge of the bottom part 6a. The bottom part 6a of the thrust member 6 contacts the bottom part 3b of the housing 3, and the end surface of the raised part 6b contacts the lower end surface 4b of the bearing sleeve 4.

Figure 2B:
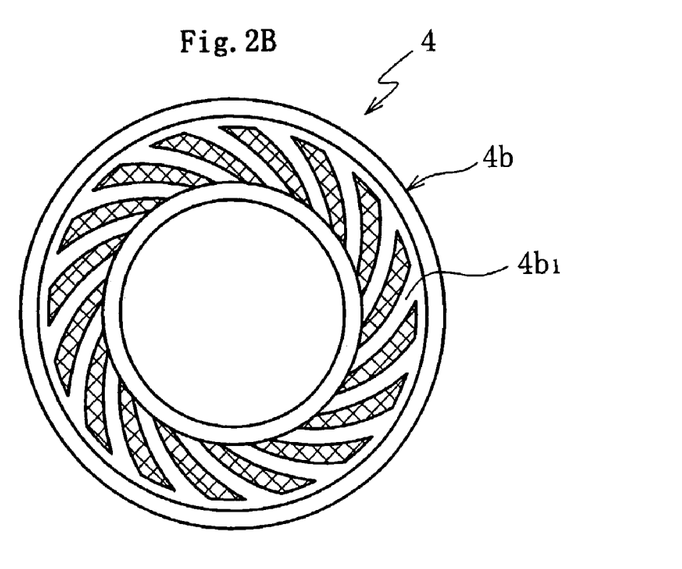
FIG. 2B is a bottom view of the bearing sleeve.

A first thrust bearing part T1 is provided between the lower end surface 4b of the bearing sleeve 4 and the upper end surface 2b1 of the flange part 2b of the axial member 2, and a second thrust bearing part T2 is provided between the thrust bearing surface 7 and the lower end surface 2b2 of the flange part 2b. The region which represents the thrust bearing surface of the first thrust bearing part T1 is formed, for example, on the lower end surface 4b of the bearing sleeve 4, and the region which represents the thrust bearing surface of the second thrust bearing part T2 is formed, for example, on the thrust bearing surface 7. As shown in FIG. 2B, a plurality of dynamic pressure generating grooves 4b1 which are arranged in a spiral pattern are formed within these regions which function as the thrust bearing surfaces (the region which functions as the thrust bearing surface of the second thrust bearing part T2 is omitted from the figure).

The dynamic pressure generating groove pattern within the regions which function as thrust bearing surfaces need not necessarily be a spiral pattern, and other patterns such as a herringbone pattern can also be used. Furthermore, either one, or both, of the dynamic pressure generating groove containing thrust bearing surfaces can also be formed on the end surfaces 2b1, 2b2 of the flange part 2b of the axial member 2.

The sealing means 5 shown in FIG. 1 is used to prevent oil leaking out from inside the housing 3, and this embodiment shows a structure in which a ring shaped sealing member 5a is mounted inside the inner periphery of the opening part of the housing 3, forming a non-contact taper seal. An inner peripheral surface 5a1 of the sealing member 5a is formed as a tapered surface which increases in diameter in the upward direction, and a lower end surface 5a2 of the sealing member contacts the upper end surface 4c of the bearing sleeve 4. A tapered sealing space S which gradually increases in size in the direction of the exterior of the housing 3 (namely, in the upward direction) is formed between the inner peripheral surface of the sealing member 5a and the outer peripheral surface of the axial part 2a. The interior space of the housing 3 sealed by the sealing member 5a, including the internal pores within the bearing sleeve 4, is filled with a lubricating oil (or a lubricating grease), and the surface of the lubricating oil sits within the sealing space S.

The tapered sealing space S can also be constructed in the opposite manner to that described above, with a tapered surface formed on the outer peripheral surface of the axial part 2a of the axial member 2, and the opposing fixed surface (in the figure, the inner peripheral surface of the sealing member 5a) then formed as a straight cylindrical surface.

During relative rotation of the axial member 2 and the bearing sleeve 4, for example when the axial member 2 is rotated, dynamic pressure of the lubricating oil develops within the radial bearing gap between the radial bearing surface and the outer peripheral surface of the axial part 2a, and the axial part 2a of the axial member 2 is supported by an oil film of the lubricating oil which forms within this radial bearing gap, generating a non-contact state in the radial direction in which the axial part 2a is capable of free rotation. As a result, the first radial bearing part R1 and the second radial bearing part R2, which support the axial member 2 in a freely rotatable, non-contact state in the radial direction, are generated. At the same time, dynamic pressure of the lubricating oil also develops within the first thrust bearing gap between the lower end surface 4b of the bearing sleeve 4 and the upper end surface 2b1 of the flange part 2b, and within the second thrust bearing gap between the lower end surface 2b2 of the flange part 2b and the thrust bearing surface 7, and the flange part 2b of the axial member 2 is supported by oil films of the lubricating oil which form within these two thrust bearing gaps, generating a non-contact state in both thrust directions in which the flange part 2b is capable of free rotation. As a result, the first thrust bearing part T1 and the second thrust bearing part T2, which support the axial member 2 in a freely rotatable, non-contact state in both thrust directions, are generated.

This bearing device 1 can be assembled by housing the thrust member 6, the axial member 2, and the bearing sleeve 4 inside the drawn housing 3, inserting the sealing member 5a, and then using a technique such as caulking to subject the top edge of the housing 3 to a radially inward facing plastic deformation to form the engagement part 3c, so that this engagement part 3c engages with the sealing member 5a. During this assembly, if required, an adhesive may also be applied to the clearance between the engagement part 3c and the sealing member 5a, prior to the sealing of this clearance.

According to this assembly process, the sealing member 5a, the bearing sleeve 4, and the thrust member 6 are all housed inside the housing in a state of mutual contact, and consequently each of these members can be positioned without requiring an adhesive or the like to secure each member to the housing, meaning the assembly process can be both simplified, and completed at reduced cost (of course, if required, securing via an adhesive can also be used). Because the housing 3 is a press molded product, as described above, the housing 3 itself can also be produced at a lower cost than conventional turned housings, which contributes to even further cost reductions for the overall bearing device.

As follows are descriptions of other embodiments of the present invention. The following descriptions focus on those points which differ from the embodiment shown in FIG. 1 and FIG. 2, and those parts or members in common with the first embodiment are labeled with the same reference symbols, and any duplication within the description is omitted.

Figure 3:
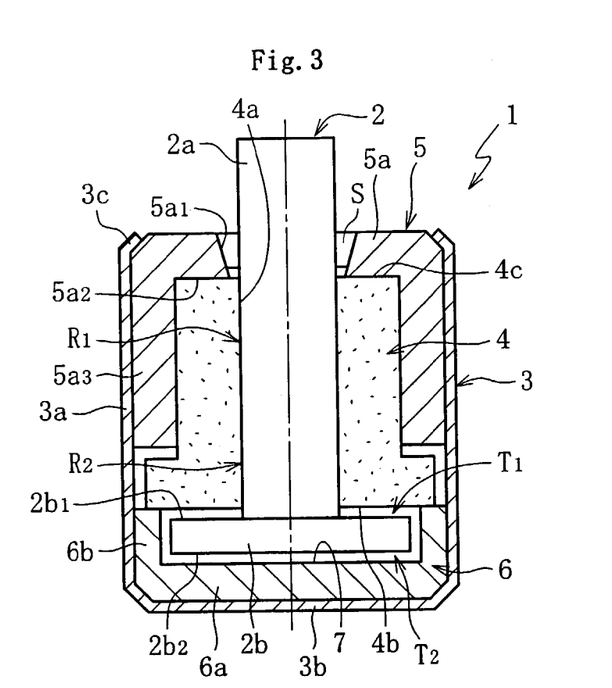
FIG. 3 is a cross-sectional view showing another embodiment of the hydrodynamic bearing device.

FIG. 3 is an embodiment in which an extension part 5a3 which extends in an axial direction is formed on the sealing member 5a, and in which the outer periphery of the bearing sleeve 4 engages with the inner periphery of this extension part 5a3. The part of the bearing sleeve 4 which engages with the extension part 5a3 is formed with a narrower diameter than the other parts of the bearing sleeve, and as a result, the capacity of the bearing sleeve 4 is reduced in comparison with the embodiment shown in FIG. 1 and the quantity of oil contained within the bearing sleeve 4 is also reduced, enabling fluctuations in the oil surface caused by temperature fluctuations to be suppressed. Furthermore, this embodiment offers an additional advantage in that the coaxiality of the bearing sleeve 4 and the sealing member 5a is also more easily maintained.

FIG. 4 shows an embodiment in which the thrust member 6 from the embodiment shown in FIG. 1 is integrated into the housing 3, thereby reducing the number of components and reducing costs. In this case, a stepped part 3d in the housing 3, which corresponds with the raised part 6b of the thrust member 6 in the first embodiment, contacts the lower end surface of the bearing sleeve 4, thereby positioning the bearing sleeve 4, and setting the widths of the first and the second thrust bearing gaps to prescribed values.

FIG. 5 shows an embodiment in which the sealing means 5 of the embodiment shown in FIG. 4 is integrated into the housing 3, by providing a narrow diameter part 3e generated by reducing the diameter of the housing 3 (using a technique such as necking, for example) instead of the sealing member 5a. An inner peripheral surface 3e1 of this narrow diameter part 3e is formed as a tapered surface which increases in diameter in the upward direction, and a tapered sealing space S is formed between this inner peripheral surface 3e1 and the outer peripheral surface of the axial part 2a. In such a case, the continuous part between the peripheral part 3a of the housing 3 and the narrow diameter part 3e functions as the aforementioned engagement part 3c, directly restricting and regulating the movement of the bearing sleeve 4 from the sealed side. In this embodiment, because the sealing member 5a is omitted, costs can be reduced even further than the embodiment shown in FIG. 4.

FIG. 6 shows an embodiment in which the part corresponding with the thrust member 6 of the embodiment shown in FIG. 5 (which was formed as a thick walled part) is omitted, and the entire housing 3 is formed with a uniform thin walled construction. In the embodiments shown in FIG. 4 and FIG. 5, the part corresponding with the thrust member 6 (refer to FIG. 1 and FIG. 3) is formed as a thick walled part, and as a result the drawing process must be split into a number of stages of varying thickness. In contrast, in the construction shown in FIG. 6, this type of multi stage drawing process is no longer necessary, meaning the productivity can be improved. In the case of this embodiment, the outer periphery at the unsealed side of the housing 3 is squeezed to form a narrow diameter part 3f, thereby forming a stepped part 3d in the radial direction, and by bringing this stepped part 3d into contact with the lower end surface 4b of the bearing sleeve 4, the bearing sleeve 4 can be positioned and the widths of the thrust bearing gaps can be set.

FIG. 7 shows an embodiment in which a disk shaped thrust member 6 made of an oil impregnated sintered metal is positioned in the bottom part of the housing 3, and the upper end surface of this thrust member 6 is then used as the thrust bearing surface 7. In such a case, the second thrust bearing part T2 is of the same construction as the oil impregnated bearing, and consequently friction between the flange part end surface 2b2 of the axial member 2 and the thrust bearing surface 7 during starting and stopping of the motor can be reduced, enabling the wear on both components to be suppressed, and the life of the product to be extended. Furthermore, if dynamic pressure generating grooves for the second thrust bearing part T2 are formed in the thrust bearing surface 7, then because the thrust member 6 is formed from a sintered metal of superior workability, press molding or the like can be used to form low cost, high precision dynamic pressure generating grooves. For the same reasons, the thrust members 6 shown in FIG. 1 and FIG. 3 may also be made of an oil impregnated sintered metal.

Figure 8:
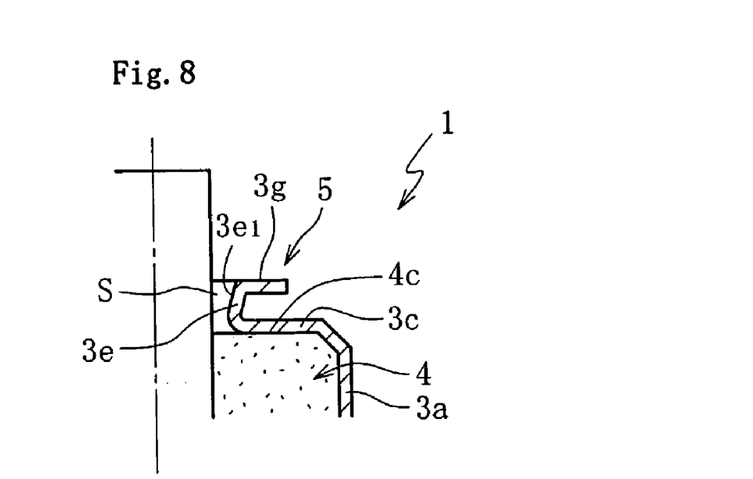
FIG. 8 is an enlarged sectional view showing yet another embodiment of the hydrodynamic bearing device.

FIG. 8 shows an embodiment in which the end part of the narrow diameter part 3e of the housing 3 in the embodiments shown in FIG. 5 through FIG. 7 is bent radially outward by plastic deformation to form a flat surface 3g, and by applying an oil repellent agent to this flat surface 3g, a powerful oil leakage prevention effect can be achieved.

Figure 9:
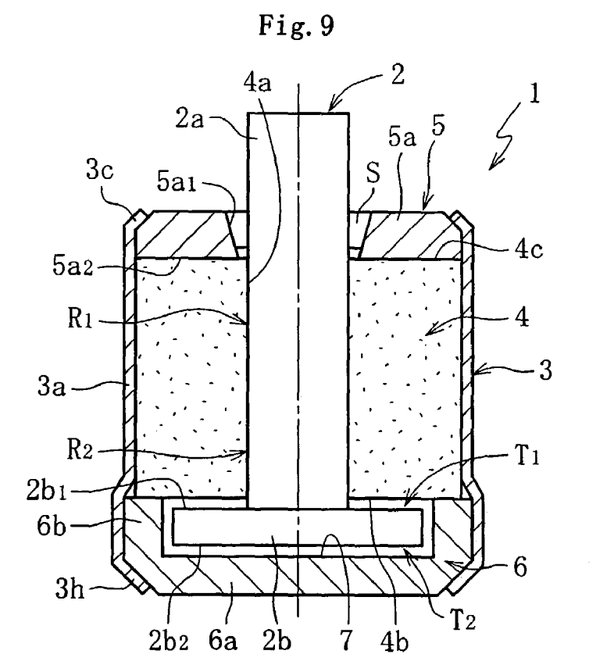
FIG. 9 is a cross-sectional view showing yet another embodiment of the hydrodynamic bearing device.
Figure 10:
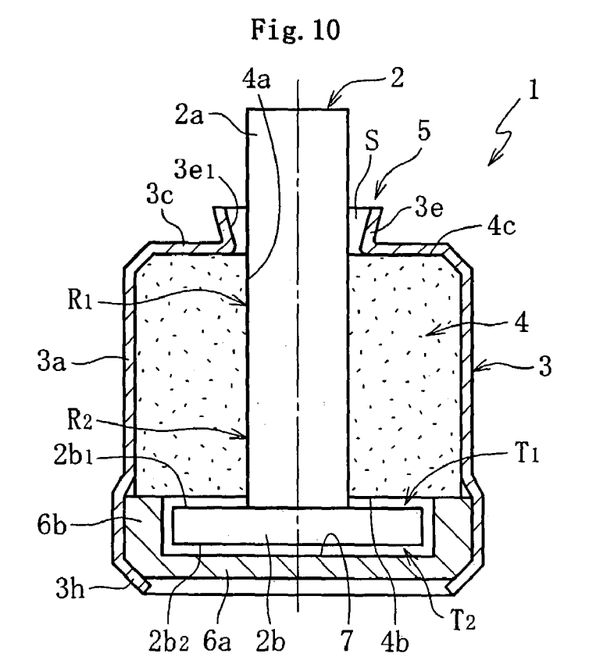
FIG. 10 is a cross-sectional view showing yet another embodiment of the hydrodynamic bearing device.

FIG. 9 and FIG. 10, unlike the embodiments of FIG. 1 through FIG. 8 in which the housing 3 is formed by drawing of a metal plate, show embodiments in which the housing 3 is formed by partial plastic deformation of a metal pipe material. In such a case, the housing 3 is open at both ends, and the upper end is sealed with sealing means 5 (in FIG. 9, a sealing member 5a is used, whereas in FIG. 10, a narrow diameter part 3e within the housing 3 is used), and the lower end is sealed with a cup shaped thrust member 6 which contacts the lower end surface 4b of the bearing sleeve 4. An engagement part 3h is formed in the housing 3 through a radially inward facing plastic deformation of the unsealed end part of the housing 3, and the thrust member 6 is prevented from dropping out of the housing by engaging this engagement part 3h with the thrust member 6. In such a case, by sealing the gap between the engagement part 3h and the thrust member 6 with an adhesive, oil leakage can be prevented even more reliably. Suitable examples of the metal pipe material include not only typical finished products with no joins in the circumferential direction, but also pipe shaped materials formed by drawing of metal plates.

FIG. 12 through FIG. 17 show embodiments in which the inner periphery of the housing 3 and the outer periphery of the bearing sleeve 4 are brought into partial elastic contact.

These bearing devices includes an axial member 2, a press molded housing 3, a bearing sleeve 4 secured to the inner periphery of the housing 3, sealing means 5 for sealing one end of the housing 3, and a thrust member 6 provided in the bottom part of the housing 3 as the principal structural elements, in a similar manner to each of the hydrodynamic bearing devices shown in FIG. 1 through FIG. 10. Either one, or a plurality of circulation grooves 8 for circulating oil within the housing 3 from the unsealed side to the sealed side are formed in the outer periphery of the bearing sleeve 4 (in the embodiments shown in FIG. 1 through FIG. 10, circulation grooves 8 were omitted from the figures). The sealed side of the circulation grooves 8 open into a space 9 formed in an external part between the end surface 4c of the bearing sleeve 4 and the opposing inner surface of the housing 3.

Figure 12:
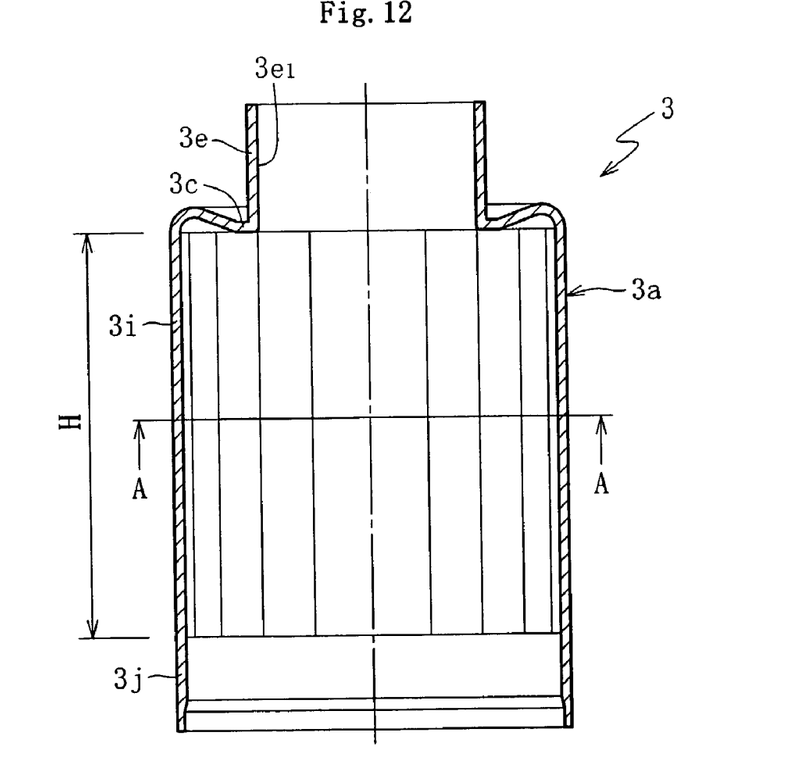
FIG. 12 is a cross-sectional view of a housing.
Figure 13:
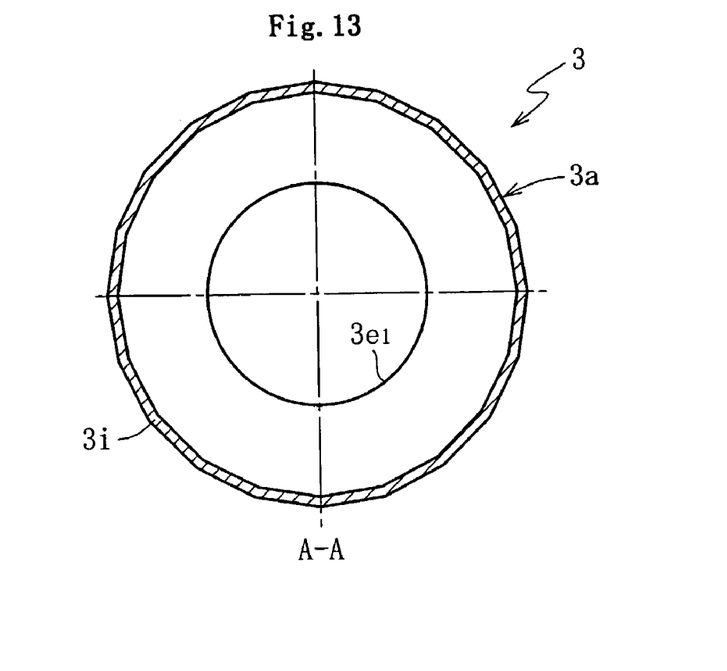
FIG. 13 is a cross-sectional view taken along the line A—A in FIG. 12.

The housing 3 includes a peripheral part 3a, an engagement part 3c and a narrow diameter part 3e. A non-circular part 3i with a polygonal lateral cross-section is formed in the peripheral part 3a of the housing 3, within a region H beginning from the sealed side thereof, and a cylindrical, circular part 3j is formed at the unsealed side thereof.

The non-circular part 3i is a polygonal shape with from 5 to 40 angles in a lateral cross-section (the example in the figures shows the case of a 20 angled icosagon), and incorporates partial contact parts which contact the outer peripheral surface of the bearing sleeve 4.

The circular part 3j is formed from a contact part which contacts the outer periphery of the thrust member 6 (refer to FIG. 14), and an opposing part which opposes the outer periphery of the flange part 2b of the axial member 2. If the flow of oil through the first and the second thrust bearing parts T1 and T2 is not impeded, and the degree of contact between the outer periphery of the thrust member 6 and the inner periphery of the housing 3 can be ensured, then the circular part 3j can be omitted, and the entire axial length of the peripheral part 3a can be formed as the non-circular part 3i.

Figure 14:
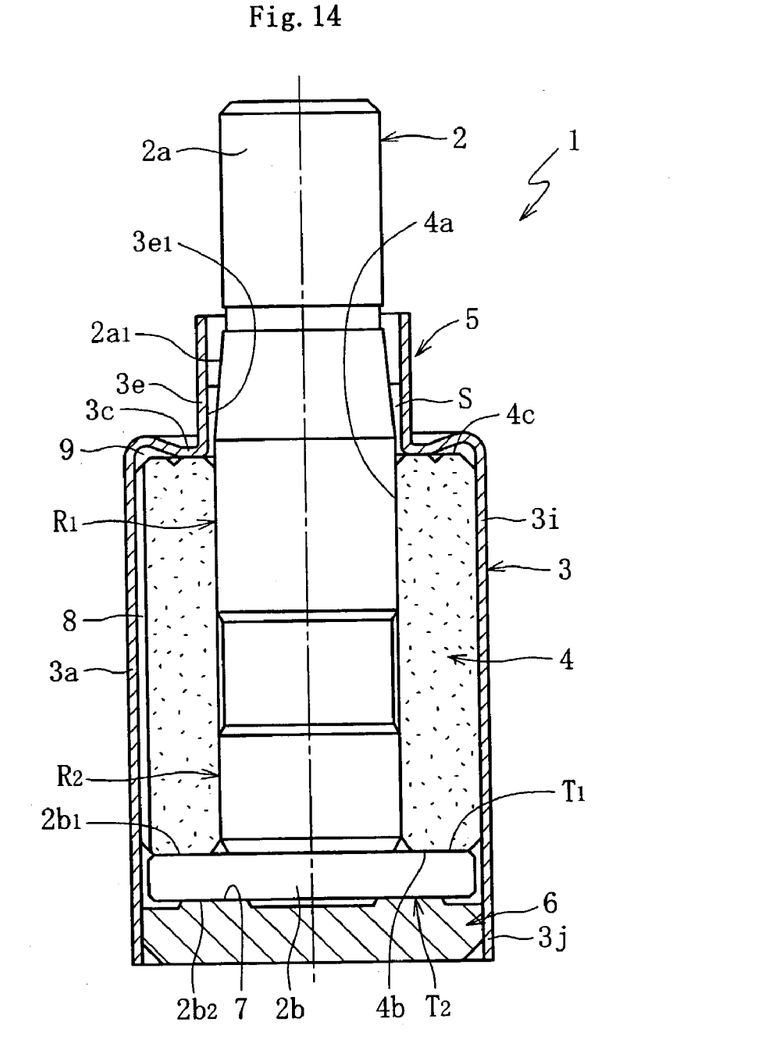
FIG. 14 is a cross-sectional view of a hydrodynamic bearing device having the housing shown in FIG. 12 and FIG. 13.
Figure 15:
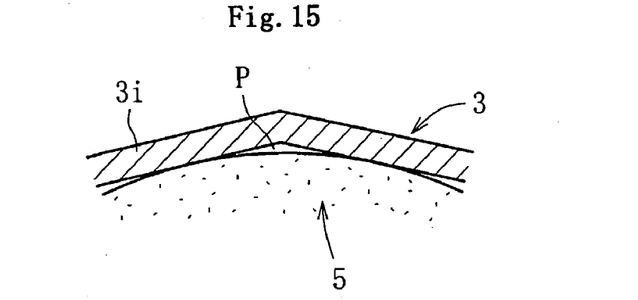
FIG. 15 is an enlarged sectional view of the vicinity of a contact part between the inner periphery of a housing and the outer periphery of a bearing sleeve.

By press fitting a cylindrical bearing sleeve 4 into this type of housing 3 with a non-circular part 3i, the outer periphery of the bearing sleeve 4 and the inner periphery of the housing 3 are brought into partial contact around the circumferential direction, using the elasticity available in the radial direction, and consequently the compressive stress acting on the interior of the bearing sleeve 4 is reduced. Accordingly, the narrowing in the inner periphery (the radius dimension) of the bearing sleeve 4 following press fitting can be suppressed to no more than 2 $\mu$m around the entire periphery, and preferably no more than 1 $\mu$m, enabling reductions in the precision of the radial bearing surface and the radial bearing gap to be substantially avoided. In the case of a plate thickness of 0.1 to 0.25 mm, a narrowing of no more than 1 $\mu$m can be achieved by setting the interference during press fitting to no more than 30 $\mu$m.

Figure 18:
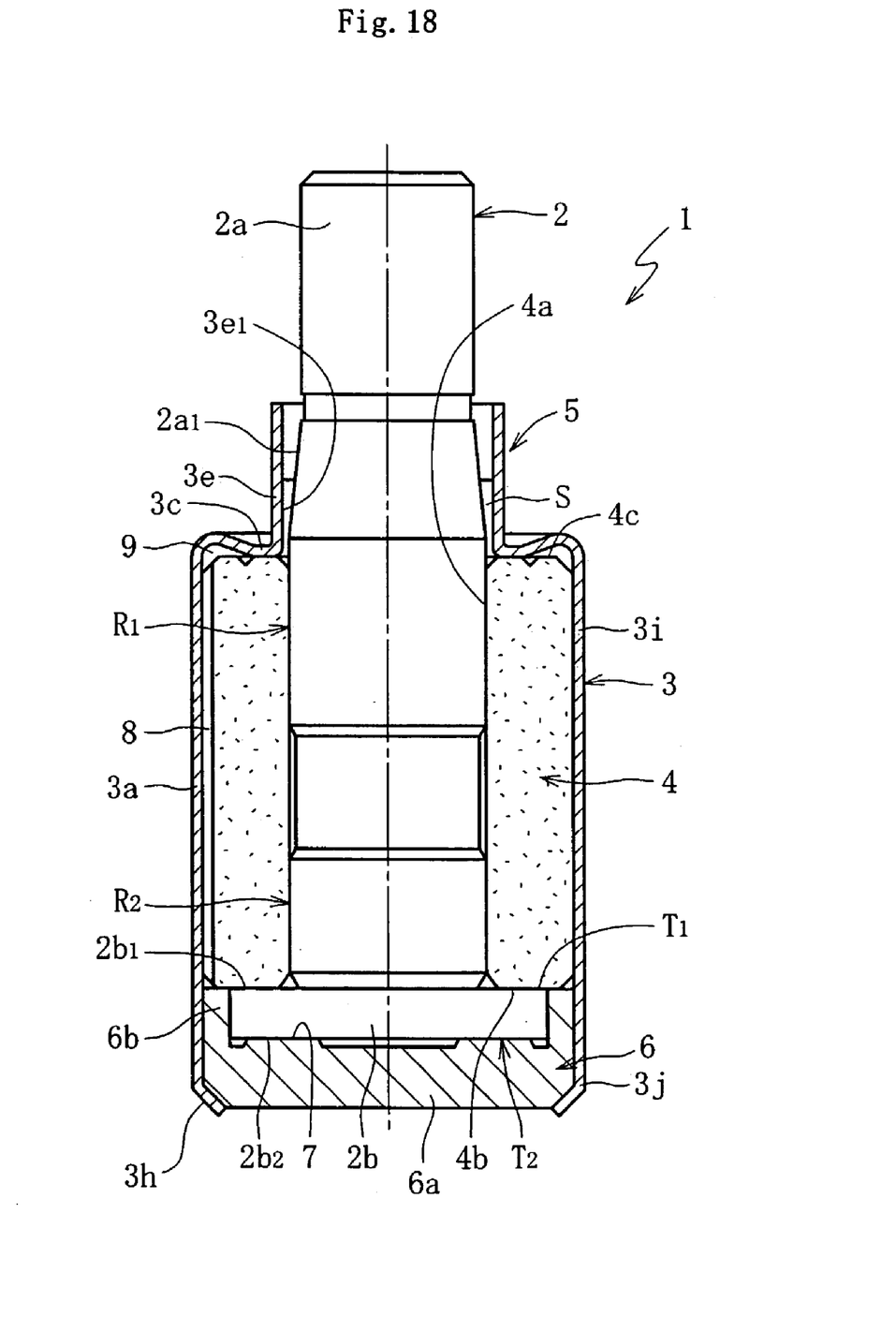
FIG. 18 is a cross-sectional view showing another embodiment of the hydrodynamic bearing device shown in FIG. 14.

In addition, because the bearing sleeve 4 is secured in an axial direction by the elastic contact between the non-circular part 3i of the housing 3 and the bearing sleeve 4, parts for directly or indirectly regulating the movement of the bearing sleeve 4 towards the unsealed side, namely the bottom part 3b (refer to FIG. 1 and FIG. 3), the stepped part 3d (refer to FIG. 4 through FIG. 7), or the engagement part 3h (refer to FIG. 9 and FIG. 10), are no longer necessary, enabling the formation costs for the housing 3 to be further reduced. Of course these parts 3b, 3d, or 3h may still be provided on the housing 3, provided that they cause no particular problems. FIG. 18 shows an example in which an engagement part 3h is formed on the housing 3.

The gaps P (refer to FIG. 15) formed between the inner periphery at the angle parts of the polygonal part of the housing 3 and the outer periphery of the bearing sleeve 4 can exhibit an oil circulation function similar to the circulation grooves 8. Furthermore, by inserting an adhesive into these gaps P, the bonding strength between the housing 3 and the bearing sleeve 4 can be improved.

In this embodiment, the thrust member 6 is formed as a thick flat plate, and is secured at the unsealed open end of the housing 3 using press fitting, an adhesive, or a combination of both techniques. Because the bearing sleeve 4 is secured in an axial direction by the elastic contact between the inner periphery of the housing 3 and the bearing sleeve 4, as described above, the raised part 6b (refer to FIG. 1, FIG. 3, FIG. 9, and FIG. 10) which contacts the unsealed end surface 4b of the bearing sleeve 4 is unnecessary.

In the example shown in the figures, the sealing means 5 is formed in a similar manner to that shown in FIG. 5 through FIG. 8 and FIG. 10, by narrowing the diameter of the sealed end part of the housing 3. The tapered sealing space S is generated by forming the inner peripheral surface 3e1 of the narrow diameter part 3e of the housing 3 as a straight cylindrical surface, and providing a tapered surface 2a1 on the outer periphery of the opposing axial part 2a.

Figure 16:
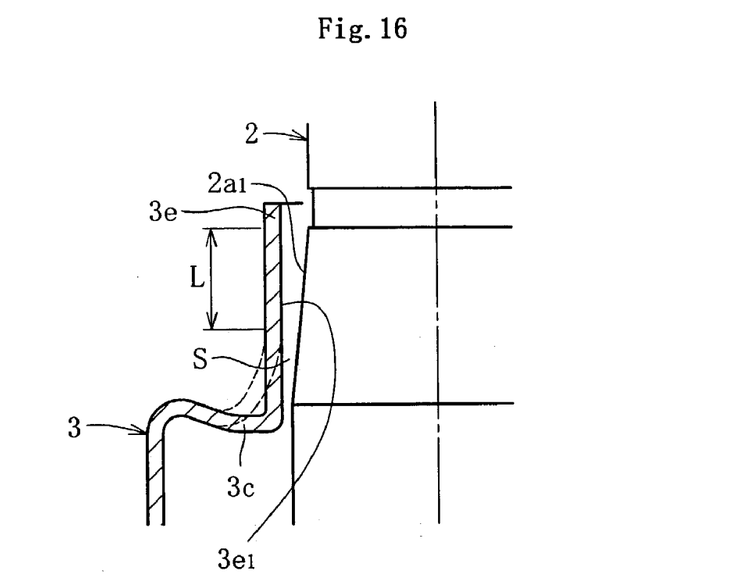
FIG. 16 is an enlarged sectional view of the vicinity of a sealing device of the hydrodynamic bearing device shown in FIG. 14.

In those cases in which the molding precision of the narrow diameter part 3e cannot be adequately ensured, cases may arise in which the part from the engagement part 3c through to the narrow diameter part 3e generates a large radius of curvature, so that the effective length L of the taper seal is reduced, as shown by the dashed lines in FIG. 16. However, this problem can be solved by using sealing means 5 which utilizes a ring shaped sealing member 5a, in a similar manner to the embodiments shown in FIG. 1, FIG. 3, FIG. 4, and FIG. 9. In such a case, provided the sealing member 5a is made of a resin material, the sealing member 5a can be secured within the inner periphery of the housing 3 using either an adhesive or ultrasonic welding. In addition, if the sealing member 5a is made of a transparent resin material, then securing using laser welding is also possible. The sealing member 5a could also be secured using an engagement part 3c similar to that of the embodiment shown in FIG. 1.

In the non-circular part 3i, at least the inner peripheral surface must be of a polygonal shape, and either both the inner periphery and the outer periphery can be formed as polygonal shapes, as shown in FIG. 13. Alternatively, just the inner periphery may be a polygonal shape (and the outer periphery formed as a simple cylindrical shape, for example). This type of case, in which the inner peripheral surface of the housing 3 is a polygonal shape and the outer peripheral surface is a cylindrical shape, offers the advantage that the operation of mounting the housing 3 inside the casing 9 (refer to FIG. 11) is relatively simple.

Figure 17:
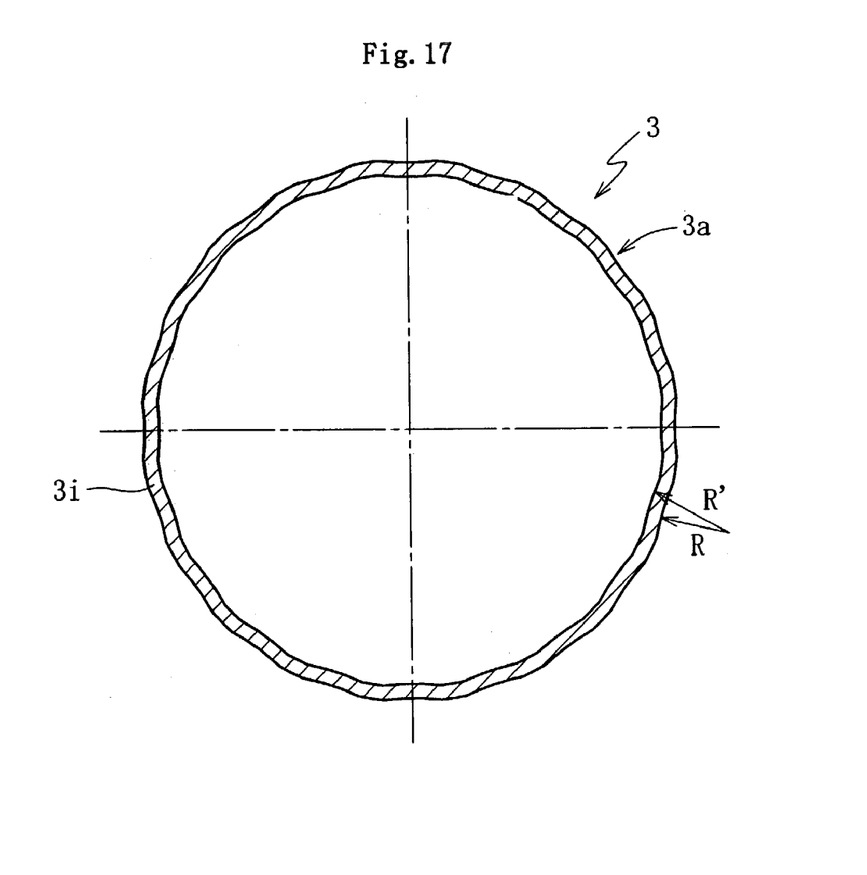
FIG. 17 is a cross-sectional view showing another housing shape.

In addition, the same effects as those described above can be achieved by forming the non-circular part 3i with a wave shaped cross-section comprising a series of circular arcs, as shown in FIG. 17. In the example shown in the figure, both the inner periphery and the outer periphery of the housing 3 are formed from circular arcs with radii of curvature R, R', although the outer periphery could also be formed as a cylindrical shape.

Furthermore, the inner periphery of the housing 3 could also be formed as a cylindrical surface, and a non-circular part 3i with a polygonal or wave shaped lateral cross-section then formed on the outer peripheral surface of the bearing sleeve 4.

The above description presents examples of hydrodynamic bearing devices in which the first and the second thrust bearing parts T1 and T2 support the axial member 2 in a non-contact state, although the present invention is not limited to such cases, and can also be applied to hydrodynamic bearing devices with contact type thrust bearing parts, in which the shaft end of the axial member 2 is supported using a pivot arrangement.

According to the present invention, both the production process for the housing and the assembly process for the bearing device can be simplified, and the number of components required can also be reduced. Accordingly, considerable reductions in cost can be achieved for a hydrodynamic bearing device.

What is claimed is:

1. A hydrodynamic bearing device including an axial member, a bearing sleeve, a housing with the bearing sleeve secured to an inner periphery thereof, a radial bearing gap formed between an outer periphery of the axial member and the inner periphery of the bearing sleeve, and sealing means with a sealing space having a surface of a lubricating oil therein for sealing one end of the housing, in which by relative rotation of the axial member and the bearing sleeve, pressure is generated in the radial bearing gap by a fluid dynamic pressure effect, thereby supporting the axial member and the bearing sleeve in a non-contact state, wherein the housing is a press molded product.

2. A hydrodynamic bearing device according to claim 1, further comprising a thrust bearing surface which opposes an end surface at an unsealed side of the bearing sleeve across an intervening space, and a flange part on the axial member which is positioned within the space, wherein a first thrust bearing gap is formed between the end surface at the unsealed side of the bearing sleeve and one end surface of the flange part, and a second thrust bearing gap is formed between an opposing end surface of the flange part and the thrust bearing surface.

3. A hydrodynamic bearing device according to claim 2, wherein the thrust bearing surface is formed on a thrust member which contacts the end surface at the unsealed side of the bearing sleeve.

4. A hydrodynamic bearing device according to claim 2, wherein the thrust bearing surface is integrally formed with the housing.

5. A hydrodynamic bearing device according to claim 4, wherein a stepped part is provided in the housing, and the stepped part engages with the end surface at the unsealed side of the bearing sleeve.

6. A hydrodynamic bearing device according to claim 2, wherein the thrust bearing surface is formed on a thrust member made of an oil impregnated sintered metal.

7. A hydrodynamic bearing device according to claim 1 or 2, wherein the housing is formed by at least a partial plastic deformation of a metal pipe material.

8. A hydrodynamic bearing device according to claim 3, wherein the housing is formed by at least a partial plastic deformation of a metal pipe material.

9. A hydrodynamic bearing device according to claim 8, wherein a radially inward facing plastic deformed engagement part is provided at an unsealed side of the housing, and the engagement part engages with the thrust member.

10. A hydrodynamic bearing device according to any one of claim 1 through claim 3, wherein an inner periphery of the housing and an outer periphery of the bearing sleeve undergo partial contact.

11. A hydrodynamic bearing device according to claim 10, wherein a cross-sectional shape of either one of the outer periphery of the bearing sleeve and the inner periphery of the housing is a polygon or a wave shape.

12. A hydrodynamic bearing device according to claim 10, wherein the bearing sleeve is press filled into the inner periphery of the housing, and a narrowing in an internal radius of the bearing sleeve following the press filling is no more than 2 $\mu$m.

13. A hydrodynamic bearing device according to any one of claim 1 through claim 3, wherein the bearing sleeve is press filled into the inner periphery of the housing, and a narrowing in an internal radius of the bearing sleeve following the press filling is no more than 2 $\mu$m.

14. A hydrodynamic bearing device according to any one of claim 1 through claim 6, wherein the housing is formed by drawing of a metal plate.

15. A hydrodynamic bearing device according to claim 1, wherein the sealing means is formed from a ring shaped sealing member.

16. A hydrodynamic bearing device according to claim 15, wherein a radially inward facing plastic deformed engagement part is provided at a sealed side of the housing, and the engagement part engages with the sealing member.

17. A hydrodynamic bearing device according to claim 1, wherein the sealing means is formed by narrowing a diameter of the housing.

18. A hydrodynamic bearing device according to claim 17, wherein a radially inward facing plastic deformed engagement part is provided at a sealed side of the housing, and the engagement part engages with the bearing sleeve.

* * * * *